United States Patent
Knudsen

[15] 3,667,673
[45] June 6, 1972

[54] WIND ACTUATED CONTROL DEVICE AND METHOD OF REGULATION THEREOF

[72] Inventor: Vlademar Knudsen, 2443 Makiki Heights Drive, Honolulu, Hawaii 96822

[22] Filed: Nov. 5, 1970

[21] Appl. No.: 87,073

[52] U.S. Cl. ................................239/1, 239/256, 239/265
[51] Int. Cl. .......................................................B05b 17/00
[58] Field of Search......................239/1, 265, 177, 261, 256

[56] References Cited

UNITED STATES PATENTS

| | | | |
|---|---|---|---|
| 1,232,208 | 7/1917 | Buckner | 239/261 |
| 1,796,942 | 3/1931 | Pottenger, Jr. | 239/DIG. 1 |
| 2,988,287 | 6/1961 | Sherman | 239/177 X |
| 3,099,393 | 7/1963 | Lent | 239/265 X |

*Primary Examiner*—M. Henson Wood, Jr.
*Assistant Examiner*—John J. Love
*Attorney*—Mauro & Lewis

[57] ABSTRACT

The invention comprises an assemblage of a wind-sensitive device coupled to responsive power-operated means which in turn are connected to a given deice which requires movement or adjustment dictated by wind direction or wind velocity, or both.

In the example given, the invention, as shown in the specification, is shown by way of illustration, as connected to and controlling the nozzle fit of a rotary irrigation sprinkler, with respect to the horizontal, and with respect to the wind-velocity and direction, in order automatically to achieve an optimum spray pattern.

6 Claims, 3 Drawing Figures

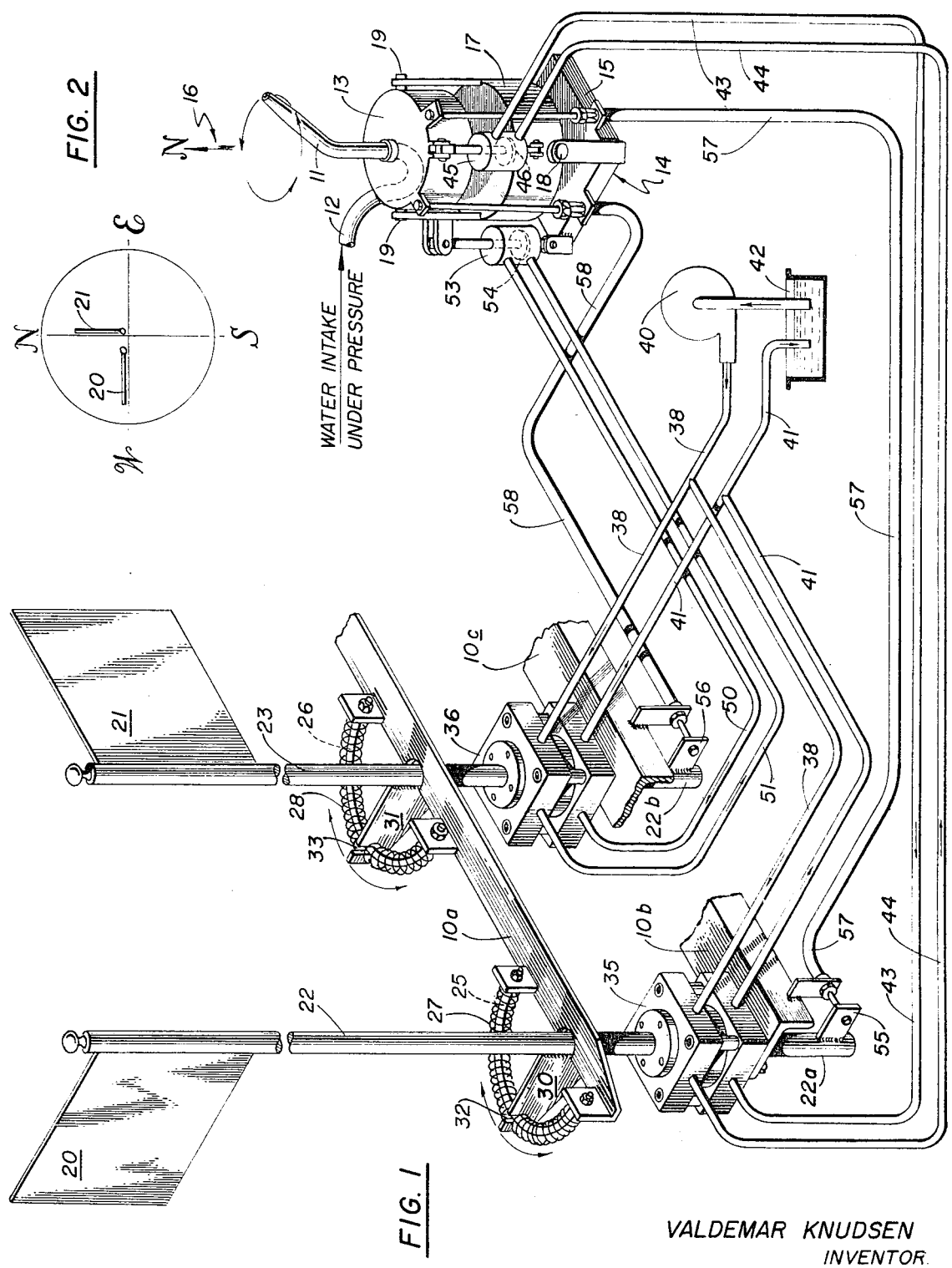

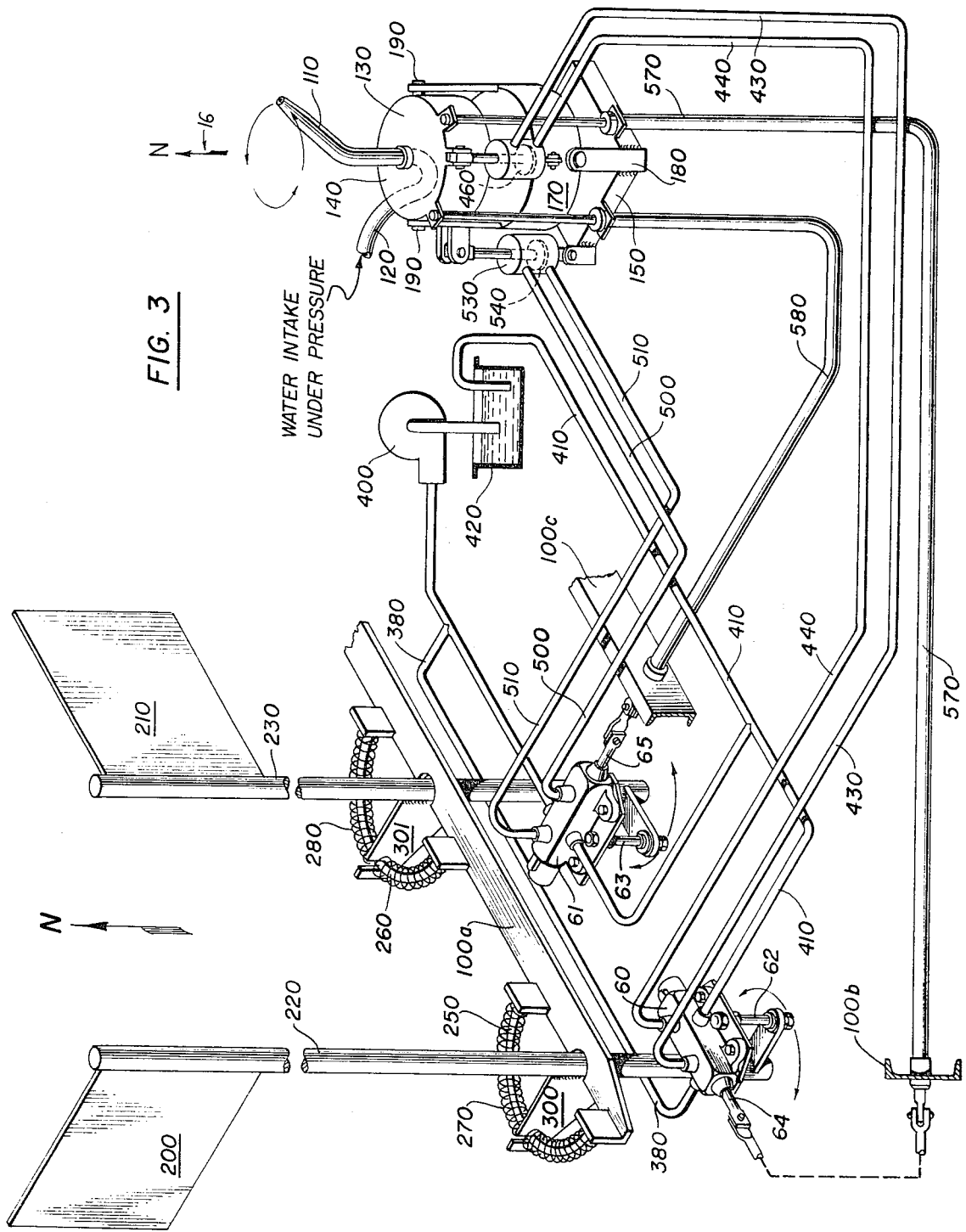

WIND ACTUATED CONTROL DEVICE AND METHOD OF REGULATION THEREOF

BACKGROUND OF THE INVENTION

Broadly, the invention is useful by coupling it to any device which requires adjustment automatically depending on conditions of wind velocity and wind direction.

The invention is obviously applicable as a control device for any driven device which requires automatic adjustment due to wind conditions. A few examples would be windmills, windows, chimney vents, wind indicators, etc.

The present invention was conceived as an aid for use in connection with large irrigation devices for use in watering crops in arid areas. These devices or machines employ rotary sprinklers which cover a wide area, are usually truck or trailer mounted, and are preferably left unattended for long periods of time. Ordinary machines of this type operate by water pressure, if available, or by pumping and rotating from an auxiliary power source.

Sophisticated examples of such machines are found in the U.S. Pat. Nos. 3,047,240 granted July 31, 1962 and in its continuation U.S. Pat. No. 3,099,393 granted July 30, 1963.

To simplify this specification, the teachings of said prior patents are incorporated herein by way of reference thereto, and the specification of this invention illustrates it as applicable to said patented sprinklers in order to demonstrate a practical and useful embodiment of the invention.

In the art of employing large rotary sprinklers for irrigating crops under arid conditions, water supplies must be conserved to the greatest extent; the spray pattern must be as uniform as intended with respect to the location of the sprinkler, and when the sprinklers are in remote locations, manual attention to the same should be reduced to the minimum for obvious economic reasons.

In this art, the factor of wind direction and velocity plays an important part. If, for example, a rotary sprinkler nozzle is adjusted at a certain elevation throughout its entire rotation cycle and if the wind shifts to other directions, or if its velocity increases or decreases, or both, the sprinkler in question will spray an irregular pattern and thus cause water wastage and crop loss.

The problem can be stated somewhat differently, by explaining that if, in a rotary sprinkler, the angle of the nozzle is adjusted to spray an even and desirable pattern in its passage through the down-wind arc, then this same nozzle setting will be too high for the upwind arc, resulting in a "blowback" where too much water is delivered too close to the sprinkler.

Partial solutions to the problem of adjusting the nozzle angle with respect to wind conditions may be found in the above cited patents. In both of these, U.S. Pat. Nos. 3,047,240 and 3,099,393, the spray nozzle is mounted on a tiltable stand whose angle with respect to terrain and wind conditions may be initially adjusted. Also, in both patents, the nozzle is reversible and can, for example, spray a downwind semicircle only.

U.S. Pat. No. 3,099,393 adds the further solution of a mechanism to speed up the nozzle movement as it passes through the upwind arc.

All of these above solutions require a manual readjustment of the mechanism whenever the wind varies, which is virtually impossible to achieve without constant attention.

BRIEF SUMMARY OF THE INVENTION

In the drawings, by way of illustration, the invention is applied to a gimbal-mounted support carrying a rotary spray nozzle. The source of water supply to said nozzle and the means for rotating it can be conventional (i.e. water pressure per se, or by an auxiliary power system) or the invention may be applied to the irrigation units shown in the above mentioned prior patents. The nozzle support and nozzle are thus rendered tiltable in any direction of the compass to a degree sufficient to adjust to both wind direction and velocity, by the means of comprising the invention.

A pair of wind vanes set at right angles to each other are deflectable by the wind, the shafts thereof being rotable and are separately connected to a pair of servo-valves or the like connected to a power operated hydraulic system. The vane shafts are also restrained in their movement by control springs. Further, the servo-valves are connected to hydraulic cylinders which in turn are connected at right angles to the rotary spray support, and the vane shafts are mechanically connected (as by flexible cable) to points adjacent the connections of the hydraulic cylinders on the rotary spray support.

The net result of the foregoing arrangement is that the hydraulic controls tilt the spray nozzle platform in such a manner as to be responsive to wind direction and velocity, but at the same time are checked in their response to a degree dictated by the aforesaid mechanical controls, as will be further explained below. Accordingly, the tilt angle of the rotary spray nozzle is constantly and automatically adjusted to wind conditions during each revolution of the spray nozzle.

The method, according to the invention, consists of the steps of providing a tiltable rotary sprinkler nozzle supplied by water under pressure and a source of rotary power; providing wind-sensitive means, and connecting these together in a way to adjust the sprinkler nozzle in a manner above described.

BRIEF DESCRIPTION OF THE DRAWING

FIG. 1 is a diagrammatic view of the invention, with parts shown in section, illustrated as applicable to the rotary nozzle of an irrigation device, the operating parts of the spray being omitted;

FIG. 2 is a diagrammatic illustration of an assumed position of the wind vanes of the invention, for use in explaining its operation in the text below; and FIG. 3 is a view similar to FIG. 1, showing an alternative valve assemblage for operating the invention.

DESCRIPTION OF THE DRAWINGS: SPECIES I

To illustrate the invention with the utmost simplicity, FIG. 1 shows it in extended diagrammatic form with most of the supporting framework such as the supports 10a, 10b and 10c shown only fragmentarily.

The device to be controlled respecting its degree of tilt as above described is the rotary spray nozzle 11 fed by a flexible hose 12. The source of water under pressure is indicated by a suitable legend; the means for rotating nozzle 11 are omitted, but may be the same as shown in the prior patents mentioned above.

Nozzle 11 is rotated above a supporting platform 13, the platform forming the top of a gimbal stand generally indicated at 14, having a base support 15. For the purposes of illustration, it is assumed that the front of the gimbal stand 14 faces South in FIG. 1, and that the rear of it faces North in the direction of the arrow "N" indicated at 16.

Gimbal stand 14 is composed of two movable portions, the lower one being an intermediate support 17 supported by a pair of pivoted arms 18 allowing support 17 to be pivoted or tilted in an East - West direction. (The rear arm 18 is not shown). Support 17 in turn carries a pair of arms 19 at right angles to arms 18 and pivotally connected to platform 13 carrying the rotary-powered nozzle 11, thus allowing platform 13 to be tilted in a North - South direction. It will thus be evident that this assemblage allows nozzle 11 to be tilted with respect to the horizontal toward any point in the compass. There are many other forms of gimbal mountings known in the art which would serve the purposes of this invention.

On the left side of FIG. 1 are shown a pair of "flags" or wind vanes 20 and 21 mounted at right angles to one another on staffs 22 and 23. For purposes of illustration, as shown in FIG. 2, when at rest, or in a situation where there is complete lack of wind, flag 20 is assumed to be erected in an East - West direction, and flag 21 is assumed to be erected in a North - South direction.

Staffs 22 and 23 are rotationally mounted throughout their lengths but the amount of such movement is restricted on their passage through frame 10a by semicircular rings 25 and 26 carrying springs 27 and 28. Arms 30 and 31 affixed to staffs 22 and 23 carry notches 32 and 33 which engage springs 27 at their midsections. By this arrangement it will be understood that the rotational capability of each of staffs 22 and 23 is limited to the possible maximum of about 180°, and that no matter in which direction staffs 22 and 23 are urged to rotate in response to wind forces exerted upon vanes 20 and 21, a resistance to said rotary movement will be exerted by the action of springs 27 and 28 against the arms 30 and 31. The desired amount of resistance is adjusted by the selection of springs having the desired compressive resistance. The operation of this portion of the invention will be explained further below.

The staffs 22 and 23 next pass into, and are connected to, the operative portions of a pair of servo-valves 35 and 36. These valves are supplied with oil under pressure through input fluid lines from fluid motor 40 and the return lines 41 feed into the sump 42 connected to motor 40.

Leading out of servo-valve 35 are a pair of fluid pipes or lines 43 and 44. These lead to the top and bottom of a cylinder 45 containing a piston 46. The cylinder 45 is pivotally connected to support 17 and the shaft of piston 46 is pivotally connected to the nozzle platform 13. Similarly, a pair of fluid lines 50 and 51 connect to the top and bottom of a cylinder 53 containing a piston 54, cylinder 53 being mounted at right angles to cylinder 45, pivotally connected to base support 15, the shaft of piston 54 being pivotally connected to platform 13, the latter connection being set at right angles to the connection for the shaft of piston 46.

The feed back shafts 22a and 22b of the servo-valves are at their lower tips fitted with extension arms 55 and 56, respectively and adjustably connected to the flexible cables 57 and 58, in turn being connected at their origins to frame segments 10b and 10c. Flexible cable 57 is attached to platform 13 of the gimbal stand 14 at a point closely adjacent the attachment thereto of the shaft of piston 46; similarly, flexible cable 58 is attached to platform 13 closely adjacent the juncture therewith of piston 54, their respective jackets being attached to the main frame.

The servo-valves 35 and 36 chosen for illustration in FIG. 1 are commercially available items known as "Servalves" (T.M. Reg. No. 780,851) made by Airoyal Engineering Company of Roseland, New Jersey. Their Bulletin No. S–1 describes the operation of such valves.

As connected to the invention, these will permit a fluid load to be delivered to a selected degree and in a selected direction into the lines 43 or 44 and lines 50 and 51, these factors of course control the action of pistons 46 and 54, and reach a static condition when the rotation of shafts 22a and 23b is checked at a given point by the mechanical action of springs 27 and 28 against arms 30 and 31.

The nozzle deck 13 continues to tilt until the feed back shafts 22a and/or 23a are rotated by the feedback cables 57 and/or 58 to coincide with the rotation of shafts 22 and 23, thereby shutting off the oil flow.

DESCRIPTION OF THE DRAWINGS: SPECIES II

FIG. 3 is a view similar to FIG. 1, the principal difference being that a different type of servo-valve is employed. Accordingly, all parts similar to those already described are given similar reference numerals with the addition of a cipher (0). For example, vane 20 of FIG. 1 is marked vane 200 on FIG. 3. These similar parts will not be redescribed except where necessary to an understanding of FIG. 3. Differing parts will be marked commencing with numeral 60.

In FIG. 3, valves 60 and 61 are substituted for the servo-valves 35–36 of FIG. 1. Valves 60–61 are standard valves of either a pressure-to-tank type, a closed center type, or tapered lands servo types. Shown by way of illustration are directional control of a "closed center" type valve.

Such valves are commercially made, for example, by the Beckett-Harcum Company of Wilmington, Ohio 45177, as illustrated in the current catalogue under the Registered Trademark "Hi-Cyclic." The valves illustrated generally in FIG. 3 and may be treated as the "pressure-to-tank" type.

These valves are mounted for rotational movement along with the staffs 220 and 230 by pivoting them on pedestals 62–63 shown fragmentarily in FIG. 3. Because of this movement, all fluid or mechanical connections with gimbal stand 140 are rendered flexible.

Due to this construction, fluid is passed through lines 430 or 440 from valve 60, and through lines 500 and 510 from valve 61, into cylinders 460 and 530 in the same manner as in FIG. 1, with consequent tilting action of the platform 130 and nozzle 110, responsive to wind action upon the vanes 200–210.

This movement is checked when the valve stems 64–65 are returned to neutral to stop the oil flow via the connections 570–580, feeding back the degree of tilt, thus closing the valve.

MODE OF OPERATION OF THE INVENTION

Referring to FIGS. 1 and 2 by way of example, if the wind is from the North, vane 21 is not influenced, but vane 20 is urged to move staff 22 counterclockwise. Oil under pressure would then flow through line 44 into the base of cylinder 45, elevating piston 46 and hence tilting platform 13 and nozzle downwardly in the direction of North, thus achieving the spray pattern results already explained as an object of the invention.

Should however, the wind be from the South, vane 21 is again not influenced, but vane 20 is urged to move staff 22 in a clockwise direction causing a flow of oil under pressure through line 43 instead of line 44, thus depressing platform 13 and nozzle 11 in a Southerly direction, by the depression of piston 46 and its connections.

In either case as above described, cable 57 will mechanically stop the tilting action exerted by piston 46 by closing the valve, the net result being the desired position as dictated by the then existing wind pressure and velocity.

If the wind blows from the West or the East, vane 21 becomes similarly active and a depressive West or East tilt of nozzle 11 results by activation of piston 54.

Obviously, if the wind blows from other directions, such as Northeast, Southwest, etc., both vanes and both staffs 22 and 23 are actuated at once, in a manner which will be understood from the simplified explanations found above.

What is claimed is:

1. A wind actuated control device for controlling the angle of pitch of a rotatable irrigation spray nozzle, said nozzle being rotatably tiltably supported and supplied with rotating means and a source of water under pressure, said control device including a supporting frame, wind-sensitive means located thereon mechanically movable in response to wind characteristics consisting of wind velocity and direction from any compass point; and means connecting said wind-sensitive means to said supported tiltable spray nozzle for depressing or elevating the delivery angle of said nozzle during rotation, in accordance with the values of said wind characteristics.

2. The invention according to claim 1, wherein the wind-sensitive means include a pair of rotatable wind vanes set at right angles to one another.

3. The invention according to claim 2, wherein the said pair of wind vanes are spring-urged to a neutral position in the absence of wind affecting their rotation.

4. The invention according to claim 1, wherein said means connecting said wind-sensitive means to said support of said spray nozzle include a hydraulic system having a source of fluid under pressure, said system including valve means having fluid connections to cylinders connected to said spray nozzle support, with piston means in said cylinders for altering the tilt of said spray support in response to said wind characteristics.

5. The invention according to claim 1, wherein the wind-sensitive means includes a pair of wind vanes rotatively mounted at right angles on a support by staffs spring-urged to a neutral position in the absence of wind affecting either of them, the staffs being each in turn connected to an hydraulic system including a servo-valve, each servo-valve being furnished with fluid under pressure, and being adjusted to supply a fluid flow in response to the movement of its connected vane staff; a pair of hydraulic cylinders containing pistons connected at right angles to the tiltable support of said rotary spray nozzle; a pair of fluid lines leading from each valve to the opposite ends of said hydraulic cylinders; and mechanical means connected between the wind vane staffs and the tiltable support of said nozzle checking the fluid line flow to said cylinders in response to said wind characteristics.

6. The method of regulating the pitch of a rotary-powered irrigation spray nozzle with respect to wind velocity and intensity, wherein the method steps consist of:

mounting said nozzle for rotary motion in such manner that its angle with respect to its horizontal mounting may be varied at any point during its cycle of rotation;

providing wind responsive means for detection of wind characteristics;

mounting said wind-responsive means in a manner to detect said characteristics consisting of wind direction and velocity from any compass point;

and connecting said wind responsive means with said nozzle mounting and said nozzle automatically to counteract by depressing said nozzle to a selected degree and to elevate said nozzle to a selected degree with respect to upwind and down-wind movements and force of said wind direction, thereby to provide an optimum irrigation pattern.

* * * * *

UNITED STATES PATENT OFFICE
CERTIFICATE OF CORRECTION

Patent No. 3,667,673　　　　　　　　　Dated June 6, 1972

Inventor(s) Valdemar Knudsen

It is certified that error appears in the above-identified patent and that said Letters Patent are hereby corrected as shown below:

On the cover sheet [72] "Vlademar" should read
-- Valdemar --; Abstract line 8, "fit" should read -- tilt --.

Signed and sealed this 19th day of December 1972.

(SEAL)
Attest:

EDWARD M. FLETCHER, JR.　　　　　　　ROBERT GOTTSCHALK
Attesting Officer　　　　　　　　　　Commissioner of Patents